United States Patent [19]
Aharoni et al.

[11] Patent Number: 6,034,202
[45] Date of Patent: Mar. 7, 2000

[54] POLYMERIZATION CATALYSTS FOR POLYESTERS

[75] Inventors: Shaul Moshe Aharoni, Morris County, N.J.; Konstantin Nikolaev Goranov, Richmond, Va.

[73] Assignee: AlliedSignal Inc., Morristown, N.J.

[21] Appl. No.: 09/261,024

[22] Filed: Mar. 1, 1999

Related U.S. Application Data

[60] Provisional application No. 60/077,083, Mar. 6, 1998.

[51] Int. Cl.[7] .............................. C08G 63/78; B01J 31/00
[52] U.S. Cl. ...................... 528/279; 528/275; 528/279; 528/280; 528/282; 528/283; 528/298; 528/299; 528/300; 528/301; 528/302; 528/306; 528/307; 528/308; 528/308.6; 502/102; 502/103; 502/107; 502/131; 502/132; 502/156; 502/169; 502/172; 502/227; 502/231; 524/783; 524/784; 524/786
[58] Field of Search ...................... 528/275, 279, 528/280, 282, 283, 298, 299, 300, 301, 302, 306, 307, 308, 308.6; 502/102, 103, 107, 131, 132, 156, 169, 172, 227, 231; 524/783, 784, 786

[56] References Cited

U.S. PATENT DOCUMENTS

| | | |
|---|---|---|
| 3,050,533 | 8/1962 | Munro . |
| 4,568,720 | 2/1986 | Aharoni . |
| 5,106,944 | 4/1992 | Sublett . |
| 5,242,645 | 9/1993 | Sasamoto . |
| 5,434,239 | 7/1995 | Bhatia . |
| 5,512,340 | 4/1996 | Goodley . |
| 5,552,512 | 9/1996 | Sublett . |

FOREIGN PATENT DOCUMENTS

| | | |
|---|---|---|
| 1522656 | 8/1978 | United Kingdom . |
| WO 92/01013 | 1/1992 | WIPO . |

OTHER PUBLICATIONS

Francois Leverd, Alain Fradet and Ernest Marechal, Study of Model Esterifications and of Polyesterifications Catalyzed by Various Organometallic derivatives—I. Study of Esterifications Catalyzed by Titanium Derivatives, vol. 23, No. 9, pp. 695–698; 1987.

Francois Leverd, Alain Fradet and Ernest Marechal, Study of Model Esterifications and of Polyesterifications Catalyzed by Various Organometallic derivatives—II. Study of Esterifications and Polyesterifications Catalyzed by Zirconium Derivatives, vol. 23, No. 9, pp. 699–704, 1987.

Francois Leverd, Alain Fradet and Ernest Marechal, Study of Model Esterifications and of Polyesterifications Catalyzed by Various Organometallic derivatives—III. Kinetic and Mechanistic Study of Esterifications Catalyzed by Tetrabutoxytitanium or Zirconium, vol. 23, No. 9, pp. 705–709, 1987.

*Primary Examiner*—Samuel A. Acquah
*Attorney, Agent, or Firm*—Jay P. Friedenson

[57] ABSTRACT

The invention provides non-antimony containing polymerization catalysts for the condensation of polyesters. The catalyst is in the form of a clear chlorine and/or bromine containing solution of a metal glycoxide and a metal glycolate having a pH in the range of from 0 to about 1, and containing chlorine and/or bromine atoms at a number ratio of chlorine and/or bromine to total metal cations in the catalyst ranging from about 0.5:1 to about 3:1. Polyesters produced with this catalyst have improved melt elasticity, and higher melt viscosity. The former property is desirable for the preparation of large and complex shaped polyester containers, and the latter property is desirable for melt spinning of industrial grade fibers and tire cords.

25 Claims, No Drawings

POLYMERIZATION CATALYSTS FOR POLYESTERS

This application claims the benefit of provisional application Ser. No. 60/077,083 filed Mar. 6, 1998.

BACKGROUND OF THE INVENTION

The present invention relates to polymerization catalysts or more particularly to non-antimony containing catalysts for the polymerization of polyesters.

It is known in the art to produce polyesters by a two step process wherein the first step involves either direct esterification or transesterification between a glycol and a diacid to produce an oligomer having up to about ten repeating units. In the second step the oligomer is polymerized to a polyester at elevated temperatures, reduced pressures and in the presence of a polymerization catalyst. Common catalysts for this second step are antimony containing, for example antimony trioxide. While antimony containing catalysts are widely used in the art, as evidenced by U.S. Pat. Nos. 5,434,239 and 5,242,645, they have serious drawbacks such as producing films having black specks, large area polarization defects and pimple rejects. Furthermore, antimony compounds frequently contain impurities which impart an undesired color to the polyester product. They also tend to precipitate or generate an elemental antimony precipitate in the reaction stream causing fouling of reaction vessels and extruding equipment. It would be desirable to be able to produce polyesters using catalysts free of antimony compounds and which do not have all of these shortcomings.

It has now been found that a polymerization catalyst which is a clear, chlorine and/or bromine containing solution of a metal glycoxide and a metal glycolate having a pH in the range of from 0 to about 1 is a much more effective catalyst for the condensation of polyester precursors into polyesters. Polyesters produced with this catalyst have improved melt elasticity and higher melt viscosity. The former property is desirable for the preparation of large and complex shaped polyester containers, and the latter property is desirable for the preparation of tire cords and industrial grade fibers.

DESCRIPTION OF THE INVENTION

The invention provides a process for the preparation of a catalyst for the polymerization of polyesters which comprises the steps of:

(a) heating at least one aliphatic polyol to a temperature in the range of from about 120° C. to about 195° C. and adding thereto an acid chloride and/or acid bromide of a trivalent metal, a tetravalent metal or mixtures thereof to form a blend;

(b) adding at least one metal alkoxide to the blend of step (a);

(c) recovering a mixture of one or more metal glycoxides with one or more metal glycolates.

Preferably step (c) is conducted by removing produced monoalcohols, hydrochloric acid, hydrobromic acid and unreacted polyols from the result of step (b), and cooling the resulting product to thereby produce a liquid polymerization catalyst which comprises a mixture of one or more metal glycoxides with one or more metal glycolates.

The invention also provides a polymerization catalyst which comprises a chlorine and/or bromine containing solution of a metal glycoxide and a metal glycolate having a pH in the range of from 0 to about 1, and containing chlorine and/or bromine atoms at a number ratio of chlorine and/or bromine to total metal cations in the catalyst ranging from about 0.5:1 to about 3:1.

The invention provides a process for producing a polyester composition which comprises condensing a reaction mixture comprising a dibasic acid or a lower allkyl ester thereof with a glycol in the presence of a catalytic amount of a polymerization catalyst which comprises a chlorine and/or bromine containing solution of a metal glycoxide and a metal glycolate having a pH in the range of from 0 to about 1, and containing chlorine and/or bromine atoms at a number ratio of chlorine and/or bromine to total metal cations in the catalyst ranging from about 0.5:1 to about 3:1.

The first step in the production of the catalysts according to the invention is forming a blend of an acid chloride and/or acid bromide of a trivalent metal, a tetravalent metal or mixtures thereof with an aliphatic polyol or mixtures thereof. The acid chlorides and acid bromides useful within the context of the present invention are those which form strong Lewis acids. That is, for an acid chlorides or acid bromides to be useful within the context of the present invention, when it is reacted with an alcohol, hydrogen is abstracted by the chlorine or bromine to form HCl or HBr and a metal alkoxide.

Useful acid chlorides within the context of the present invention include chlorides of metals from Group IIIA, Group IIIB, Group IVA, Group IVB and the lanthanide series of the Periodic Table of the Elements and mixtures thereof. Useful acid chlorides within the context of the present invention nonexclusively include zirconium tetrachloride, germanium tetrachloride, titanium tetrachloride, silicon tetrachloride, tin chloride, manganese chloride, aluminum trichloride, gallium trichloride, indium trichloride, yttrium trichloride, trichlorides of members of the lanthanide series of the Periodic Table of the Elements and mixtures thereof.

Useful acid bromides within the context of the present invention include bromides of metals from Group IIIA, Group IIIB, Group IVA, Group IVB and the lanthanide series of the Peroidic Table of the elements and mixtures thereof. Useful acid bromides within the context of the present invention nonexclusively include zirconium tetrabromide, germanium tetrabromide, titanium tetrabromide, silicon tetrabromide, tin bromide, manganese bromide, aluminum tribromide, gallium tribromide, indium tribromide, yttrium tribromide, tribromides of members of the lanthanide series of the Periodic Table of the Elements and mixtures thereof. The invention can also employ mixed chlorides-bromides of the foregoing metals. The acid chloride or acid bromide is preferably reacted with or dissolved in a $C_3$ or higher alcohol for addition to the polyol.

Useful aliphatic polyols within the context of the present invention nonexclusively include glycerin, pentaerythritol, monoalkylene glycols, dialkylene glycols, trialkylene glycols and mixtures thereof Preferred aliphatic polyols are ethylene glycol trimethylene glycol tetramethylene glycol and mixtures thereof The amount of aliphatic polyol used is a large excess relative to the amount of acid chloride and/or acid bromide. A large excess means at least two moles of aliphatic polyol per mole of acid chloride and/or acid bromide. During this reaction step, the mixture of acid chloride and/or acid bromide with the aliphatic polyols is maintained at a temperature in the range of from about 120° C. to about 195° C.; preferably from about 135° C. to about 180° C., and most preferably from about 145° C. to about 170° C.

Simultaneously with or subsequent to the addition of the acid chloride and/or acid bromide with the aliphatic polyols, one then adds at least one metal alkoxide to the blend of step (a). Suitable metal alkoxides include alkoxides of metals from Group I, Group II, Group IIIA, Group IIIB, Group IVA, Group IVB and the lanthanide series of the Periodic Table of the Elements and mixtures thereof. Suitable metal alkoxides include $C_2$ to $C_4$ alkoxides such as ethoxides, propoxides, butoxides or mixtures thereof. Nonexclusive examples of useful metal alkoxide within the context of this invention are titanium ethoxide, titanium butoxide, titanium propoxide, titanium isopropoxide, silicon ethoxide, silicon butoxide, silicon propoxide, silicon isopropoxide, germanium ethoxide, germanium butoxide, germanium propoxide, germanium isopropoxide, aluminum ethoxide, aluminum butoxide, aluminum propoxide, aluminum isopropoxide, zirconium ethoxide, zirconium butoxide, zirconium propoxide, zirconium isopropoxide and mixtures thereof. The metal alkoxide is preferably formed as a solution with a $C_2$ or higher alcohol for addition to the polyol.

The preferred molar ratio of metal alkoxide to acid chloride and/or acid bromide ranges from about 1:20 to about 4:1, preferably from about 1:3 to about 3:1, and more preferably from about 1:2 to about 2.5:1. During the addition of the metal alkoxide to the mixture of the acid chloride and/or acid bromide with the aliphatic polyols, the same temperatures as given above are maintained. The reaction is allowed to continue, that is the reaction mixture is stirred at a temperature in the range of from about 120° C. to about 195° C.; preferably from about 135° C. to about 180° C., and most preferably from about 145° C. to about 170° C. for from about 0.5 hour to about 12 hours, preferably from about 1 hour to about 6 hours. The reaction is conducted until substantially all of the produced monoalcohols, hydrochloric acid, hydrobromic acid and much of any unreacted polyols are removed as an expelled gas stream. Preferably the foregoing reaction steps are conducted under an inert atmosphere such as nitrogen gas or argon gas. Under the given conditions, the rate of expulsion of HCl, HBr and alcohols from the system is high, but not too high for the reaction to get out of control and the rate of expulsion too fast. A reaction is conducted under conditions when no HCl, HBr and alcohols evolve is considered to be too slow and a reaction conducted under conditions when the reaction mixture boils over is considered to be too fast. In the desired temperature interval, the exothermic reaction is kept smooth and volatiles are expelled at a good rate. Thereafter the resulting product is cooled to thereby produce a liquid polymerization catalyst which comprises a mixture of one or more metal glycoxides with one or more metal glycolates.

The glycoxides produced are glycoxides of the metals in the above acid chlorides, acid bromides and alkoxides. Typically produced glycoxides include single metal glycoxides such as titanium glycoxide, silicon glycoxide, germanium glycoxide, aluminum glycoxide, zirconium glycoxide and multimetal glycoxides such as Ti/Si/Zr glycoxide; Ti/Al/Zr glycoxide; Mn/Zr/Ti glycoxide and Ge/Zr/Ti glycoxide.

The glycolates produced are glycolates of the metals in the above acid chlorides, acid bromides and alkoxides. Typically produced metal glycolates include single metal glycolates such as titanium glycolate, silicon glycolate, germanium glycolate, aluminum glycolate, zirconium glycolate and multimetal glycolates such as Ti/Si/Zr glycolate; Ti/Al/Zr glycolate; Mn/Zr/Ti glycolate and Ge/Zr/Ti glycolate.

The mole ratio of the metal glycoxide to the metal glycolate in the resulting catalyst ranges from about 1:10 to about 10:1, preferably from about 5:1 to about 1:5, and more preferably from about 3:1 to about 1:3.

Glycoxide is defined as a glycol bridge wherein both —OH terminal groups are replaced by —OM where M stands for the metal cation. Thus, for ethylene glycol, HO—$CH_2$—$CH_2$—OH, the corresponding glycoxide will be MO—$CH_2$—$CH_2$—OM. The number of glycoxide bridges that may exist in a compound depends on the valence of the metal M. If the metal is of valence state 1, then only one glycoxide bridge may exist between each pair of metal ions. The ratio of metal ions to glycoxide residues will be 2/1 in this case. If the metal is at valence state 3, then there may exist 3 glycoxide bridges between each pair of metal cations: $Mg^{+3}$(—O—$CH_2$—$CH_2$—O—$)_3M^{+3}$. Hence, the ratio of metal ions to glycoxide residues will be 2/3 in this case. Glycolate is defined as a residue originating from glycol wherein only one terminal —OH is replaced by —OM while the other terminate —OH remains intact. In the case of 3-valent metal cation, the corresponding ethylene glycolate is $Mg^{+3}$(—O—$CH_2$—$CH_2$—OH$)_3$. In this case, the ratio of metal ion to glycolate residues will be 1/3. In a case of a dynamic glycoxide/glycolate equilibrium, the ratio of metal ions to glycoxide/glycolate residues is intermediate between the ratio in glycoxide and the ratio in glycolate, and its numerical value depends on the valence of the metal ion, or the mixture of metal ions, and on the amount of glycoxide bridges and glycolate residues present in the compound. These amounts, in turn, will depend on the amount of precursor glycol used, its molar ratio relative to the metal ions, the valence state of the metal ions, and on whether the reaction by which the glycol molecules react with the metal cations and become incorporated into the metal glycoxide/glycolate compound is allowed to reach completion or stopped before all potential metal-glycol bonds (i.e., M—O bonds) are consummated. The ratios of metal ions to glycol-based residues in compounds described in this invention are indicated in the following Table 1.

TABLE I

| —OH Source | f* | $M^{+1}$ | | $M^{+2}$ | | $M^{+3}$ | | $M^{+4}$ | |
|---|---|---|---|---|---|---|---|---|---|
| | | glycoxide | glycolate | glycoxide | glycolate | glycoxide | glycolate | glycoxide | glycolate |
| Glycol or diol | 2 | 2:1 | 1:1 | 1:1 | 1:2 | 2:3 | 1:3 | 2:4 | 1:4 |
| Glycerin | 3 | 3:1 | 1:1 | 3:2 | 1:2 | 1:1 | 1:3 | 3:4 | 1:4 |
| Pentaerythritol | 4 | 4:1 | 1:1 | 2:1 | 1:2 | 4:3 | 1:3 | 1:1 | 1:4 |

*f = functionality of glycol or polyol residue. The concentration of metal cations in the catalysts is, within the above boundary conditions, determined by the ratio of glycoxide to glycolate in the catalysts, and by the average valence state of the metal ions.

The resulting polymerization catalyst is in the form of a clear, stable solution having a pH in the range of from about 0 to about 1. The polymerization catlyst contains chlorine and/or bromine atoms at a number ratio of chlorine and/or bromine to total metal cations in the catalyst ranging from about 0.5:1 to about 3:1, preferably from about 0.7:1 to about 2:1, and most preferably from 0.9:1 to 1.5:1.

The process of producing polyesters involves the known initial steps of esterification of at least one dicarboxylic acid with at least one glycol, followed by polycondensation to form high molecular weight polyester. The polyester polymers are prepared from monomers in a melt-phase.

In the practice of the present invention, a polyester composition is prepared which may be produced by condensing a dibasic acid, such as a dicarboxylic acid or a lower alkyl ester thereof with a glycol. Among the dicarboxylic acids and their lower alkyl diesters which may be employed to form a melt spun fiber or a molded polyester article are terephthalic; isophthalic; phthalic; naphthalene dicarboxylic; biphenylene dicarboxylic acid, bibenzoic acid, tetrahydroterephthalic acid, tetrahydroisophthalic acid, tetrahydrophthalic acid, hydronaphthalene dicarboxylic acid, cyclohexanedicarboxylic acid, cyclopentyldicarboxylic acid, cyclooctyldicarboxylic acid, succinic; glutaric acid; sebacic; adipic; azelaic; bibenzoic; pimelic acid, malonic acid, fumaric acid, itaconic acid, their monoesters, their diesters, and mixtures thereof and bis-p-carboxyphenoxyethane. Highly useful naphthalene dicarboxylic acids include the 2,6-, 1,4-, 1,5-, or 2,7- isomers but the 1,2-, 1,3-, 1,6-, 1,7-, 1,8-, 2,3-, 2,4-, 2,5-, and/or 2,8-isomers may also be used. Dibasic acids may contain from about 3 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like. Preferred dibasic acids include terephthalic acid, isophthalic acid, naphthalene dicarboxylic acid, cyclohexane dicarboxylic acid and mixtures thereof. The dibasic acids may be used in acid form, acid anhydride form or as their esters such as the dimethyl esters. One or more of these acids and/or their-lower alkyl esters is reacted with one of more glycols which include glycols having from about 2 to about 50 carbon atoms, preferably from about 3 to about 10 carbon atoms and include ethylene glycol, propylene glycol, 1,3-propanediol, 1,4-butanediol, 1,6-hexanediol diethylene glycol, 1,4-cyclohexanediol, 1,4-cyclohexanedimethanol, neopentyl glycol; 1,8-octanediol, 1,10-decanediol, 1,12-dodecanediol, diethylene glycol, triethylene glycol, tetraethylene glycol dihydroxy-terminated higher oligomers of ethylene glycol dimer of trimethylene glycol, trimer of trimethylene glycol, dimer of tetramethylene glycol, trimer of tetrarnethylene glycol, dihydroxy-terminated higher oligomers of tetramethylene glycol, and mixtures thereof. Preferred glycols include ethylene glycol, 1,4-cyclohexane dimethanol diethylene glycol and mixtures thereof. The 1,4-cyclohexanedimethanol may be in the cis or the trans form or as cis/trans mixtures. Since one or more esters may be reacted with one or more glycols, the polyesters are not limited to homopolyesters but also includes mixed polyesters such as copolyesters as well as copolymers with other monomers.

Polymers that are particularly useful in this process include poly(ethylene terephthalate), poly(ethylene naphthalenedicarboxylate), and copolyesters containing up to about 50 mole % of modifying dibasic acids and/or glycols. Of the polyesters within the contemplation of this invention, preferred are those containing at least a major amount of polyethylene terephthalate, the most preferred are those containing at least 80 mol % terephthalic acid and 80 mol % ethylene glycol on a 200 mol % basis. Polyethylene terephthalate is formed from a polymer produced by the polymerization of bis-2-hydroxyethyl) terephthalate which is itself formed as an intermediate by one of two different methods. One method for producing bis-(2-hydroxyethyl) terephthalate is by direct esterification of terephthalic acid with ethylene glycol as described in U.S. Pat. No. 3,050,533 which is incorporated herein by reference. In this method the by-product of the reaction is water which is distilled from the reaction product. A second method for producing bis-(2-hydroxyethyl) terephthalate is by transesterification of dialkyl ester of terephthalic-acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. For example, a temperature in the range of from about the boiling temperature of the reaction mixture to as high as 250° C. may be used. The reaction can occur at atmospheric, sub-atmospheric or super-atmospheric pressure. A by-product of the transesterification reaction is an alkanol. For example, if dimethyl terephthalate is used, methanol is produced. The alkanol is then removed from the reaction product. Conventional processes for the preparation of polyesters may also be found in U.S. Pat. Nos. 4,568,720 and 5,552,512 which are incorporated herein by reference.

In order to increase the reaction rate, the catalysts according to the present invention are added to the transesterification/condensation reaction. After the intermediate bis-2-hydroxyethyl) terephthalate has been produced, it may be converted to polyethylene terephthalate by heating at a temperature above the boiling point of the ethylene glycol or the reaction mixture under conditions effecting the removal of the glycol or water. The heating may occur at a temperature as high as 325° C., if desired. During heating, pressure is reduced so as to provide rapid distillation of the excess glycol or water. The final polyethylene terephthalate polymer may have an intrinsic viscosity, as measured in orthochlorophenol at 25° C., of about 0.5 deciliter per gram or more. More preferably, the intrinsic viscosity of the polymer ranges from about 0.5 to about 1.2 deciliter per gram, measured in orthochlorophenol at 25° C. Still more preferably, the polyethylene terephthalate employed in the present invention has an intrinsic viscosity of about 0.7 to about 1.0 deciliter per gram as measured in orthochlorophenol at 25° C. Preferably the thermoplastic polyester containing polymers have a melting point prior to crystallization in the range of from about 200° C. to about 330° C. or more preferably from about 220° C. to about 290° C. and most preferably from about 250° C. to about 285° C.

The amount of catalyst used in the polymerization is such that the concentration of metal cations in the reaction texture originating from the catalyst is in the range from about 10 ppm to about 1000 ppm relative to the amount of the dibasic acid originating from the monomer feed. A more preferred concentration of metal ions originating from the catalyst is in the range of from about 15 ppm to 250 ppm, and the most preferred concentration of metal ions originating from the catalyst is in the range from about 20 ppm to about 100 ppm.

The following non-limiting examples serve to illustrate the invention. It will be appreciated that variations in proportions and alternatives in elements of the components of the photosensitive coating composition will be apparent to those skilled in the art and are within the scope of the present invention.

EXAMPLE 1
Preparation of a 3-Cation Catalyst.

In a first stage, there were carefully dissolved 109.5 g titanium isopropoxide (0.385 moles) and 28.7 g tetraethyl orthosilicate (TEOS) (0.1375 moles) and 64.1 g zirconium chloride ($ZrCl_4$) (0.275 moles) in 2-propanol to bring the total volume to 400 mL. Care was taken to run this in a well-vented hood since during the dissolution of $ZrCl_4$ in 2-propanol an exothermic reaction takes place in which gaseous HCl evolves and the pH of the solution reduces to pH<1. In a second step, the above mixture was added from a dropping pipet over 20 minutes to 500 mL ethylene glycol (EG) stirred with a magnetic egg in a 3-neck 1000 mL round bottom flask maintained at 150–160° C. The addition process was conducted under vigorous nitrogen gas flow which was introduced through one of the flask's necks and evacuated to a cold trap through another neck. When the temperature of the mixture was kept at 150–170° C., a distillate appeared and could be collected at a reasonable pace. When the temperature was lowered to about 140° C., the distillate appeared at a very slow rate, and at lower temperatures no distillate was collected. As long as 2-propanol was present in the system, the boiloff at 150° C. and higher was vigorous, and care must be taken to control it. When the free 2-propanol was depleted from the system, the reaction must be maintained at above 150° C. in order for distillate to appear. Throughout the process, gaseous HCl was detected in the nitrogen stream even when no distillate was evident. The reaction mixture remained clear throughout. The reaction was kept at 165° C. for 6 hours under constant flow of nitrogen, and a total of about 100 mL distillate was collected. Since no cooling column was used, the amount of collected distillate may be considered as a minimum and not an equimolar product. Most of the 2-propanol seems to have escaped into the atmosphere and not collected as distillate. The volume of the clear Ti:Si:Zr glycoxide-glycolate product was 430 mL. The calculated metal ion concentration was 0.001855 mol/mL. Element analysis measured a concentration of 0.001597 mol/mL. The ratio of residual chlorine, both covalently bonded chlorine and chloride ions, to metal cations was estimated at >1:1 Cl/metal. The pH of the product was pH=0. Dilution of the product up to fivefold its volume in water brought the pH up to 2–3, but caused no clouding or precipitation of any metal oxide decomposition product. The product described in this example was labeled CATALYST 1.

EXAMPLE 2
Procedure for the Preparation of 3-Cation Catalyst.

By carefully dropping $GeCl_4$ into excess 2-propanol at room temperature, there was prepared a solution of germanium isopropoxide in 2-propanol. This germanium isopropoxide solution in 2-propanol is highly acidic by virtue of the HCl which was generated by the reaction of germanium tetrachloride and 2-propanol. A solution of germanium isopropoxide in 2-propanol containing 0.125 mol germanium isopropoxide was prepared with 0.25 moles zirconium isopropoxide and 0.35 moles titanium isopropoxide in 2-propanol to bring the total 2-propanol solution volume to 350 mL. This 2-propanol solution was dropwise added to 350 mL ethylene glycol maintained at 150–160° C. with constant stirring. During the dropwise addition, the 2-propanol was boiling off and was driven away by a constant stream of nitrogen passing through the 3-neck glass reaction vessel. After the dropwise addition was completed, 2-propanol was distilled off during 3 additional hours at 150° C. After this duration, the distillation of 2-propanol essentially stopped and the heating was terminated. The clear solution remained a clear fluid, with only a minute amount of haze developing after 24 hrs. at room temperature. The total volume of final product was measured to be 325 mL and total metal ion concentration was 0.00223 mol/mL. The product described in this example was labeled CATALYST 2. It was later discovered that the haze developed in this material was due to the fact that relatively small fraction of the isopropoxides originated from the germanium tetrachloride and that the ratio of chlorine to metal atoms in CATALYST 2 was substantially smaller than 1.0.

EXAMPLE 3
Procedure for the Preparation of 3-Cation Catalyst.

To an opaque suspension of 20.4 g (0.1 mol) aluminum isopropoxide in 184 g 2-propanol (3 moles) there were dropwise from a dropping funnel added with strong agitation under a blanket of nitrogen gas, 19 grams $TiCl_4$ (0.1 mol). The reaction is exothermic and may turn violent. After the addition of the titanium tetrachloride was completed, there were added 23.5 g (0.1 mol) of $ZrCl_4$ incrementally to the 2-propanol mixture. When hot the mixture was partly soluble but upon cooling to room temperature copious opaque suspension appeared. The suspension was added at room temperature to 350 mL ethylene glycol (EG) present in a 1000 mL round bottom glass flask equipped with 3 necks and an egg-shaped magnetic stirrer. The mixture was heated under constant nitrogen flow to 155° C. Upon heating to this temperature, the mixture clarified and all particulate matter dissolved. Vigorous boiling started at bath temperature of 145° C. Strong expulsion of gaseous HCl coincided with the onset of vigorous boiling off of the 2-propanol. The clear solution was kept at 155° C. under nitrogen flow for three and a half hours. The reaction was then terminated when gaseous HCl ceased coming through in the nitrogen stream. The clear reaction product was cooled to room temperature. Its volume was 330 mL and its pH was about 0. Element analysis indicated a total metal cation concentration of 0.00091 mol/mL with a titanium concentration of 0.00030 mol/mL included. The ratio of cations was Ti/Al/Zr=0.41/0.30/0.29 respectively, and the ratio of chlorine to combined metal cations was Cl/metals=1.60. The product described in this example was labeled CATALYST 3.

EXAMPLE 4
Procedure for the Preparation of 3-Cation Catalyst.

Into 250 mL of 2-propanol at room temperature there were added 12.6 g $MnCl_2$ (anhydrous)(0.1 mol), and 23.3 g $ZrCl_4$ (anhydrous)(0.1 mol) and 36.3 g titanium isopropoxide (0.1275 mol) in small increments under a nitrogen gas blanket. The $MnCl_2$ was only sparingly soluble in the 2-propanol, such that the whole mixture, including the manganese chloride solids, was poured into 400 mL ethylene glycol present in a 3-neck 1000 mL round bottom glass flask equipped with nitrogen inlet and outlet and a magnetic stirring device. The mixture was heated under continuous nitrogen stream to about 150° C. and after about 20 minutes of stirring at this temperature all the $MnCl_2$ dissolved. Vigorous boiling off of 2-propanol commenced thereafter with gaseous HCl coming off in the nitrogen stream. The homogeneous, clear solution was kept at about 150° C. with constant stirring for 4 hours under nitrogen flow. When the HCl generation abated, the reaction was stopped and the reaction product brought to room temperature. The volume of the product was 370 mL, and its pH about 0. Elemental analysis gave total metal cation concentration of 0.000885 mol/mL from which titanium was 0.000345 mol/mL. The product described in this example was labeled CATALYST 4.

EXAMPLE 5
Procedure for the Preparation of a 1-cation Catalyst.

Under nitrogen blanket, there were carefully added dropwise 30 mL $TiCl_4$ (ca. 0.25 mol) to 120 mL 2-propanol (ca. 2 moles). A vigorous exothermic reaction took place. After the 2-propanol solution (intense yellow) cooled to room temperature, it was added dropwise through a dropping funnel under constant nitrogen flow to 260 mL ethylene glycol (EG) stirring in a 3-neck 1000 mL round bottom flask maintained at 165–170° C. It took additional 3 hours of stirring at temperature to remove the gaseous HCl and as much as possible of the 2-propanol. When the volume of the solution was reduced by evaporation at temperature to 160 mL, a haze started appearing and the reaction was terminated. The volume of the distillate was 80 mL and the rest evaporated into the atmosphere. Upon cooling to room temperature, the reaction product lost its haze and became completely water-clear. The calculated titanium concentration was 0.00156 mol/mL. The product described in this example was labeled CATALYST 5. The product was found to be soluble and stable in water at room temperature, producing aqueous solutions with pH's in the range of 2.0 to 3.0. However, when 5:1 vol/vol solution of water and the product was brought to the boiling point and kept there, a small amount of white haze did appear in the system. The pH values of such aqueous solutions were not affected by changes in temperature or by the appearance of some haze in them.

EXAMPLE 6
Procedure for the Preparation of 1-Cation Catalyst.

There were 23.3 g (0.1 mol) $ZrCl_4$ carefully dissolved in and reacted with 50 mL 2-propanol. After the exothermic reaction subsided, this highly acidic solution was added dropwise over 2 hours to 50 mL of hot (about 150° C.) ethylene glycol (EG) under a constant and strong flow of nitrogen. Highly acidic volatiles, evidenced by testing with pH paper, continued to come over in the gas stream after the dropwise addition of the 2-propanol solution was completed. It took additional 2 hours for the amount of highly acidic species in the gas stream to substantially subside. The reaction was then stopped and the clear viscous solution brought to room temperature. The clear solution remained clear upon storage at room temperature with no visible precipitation. The product described in this example was labeled CATALYST 6.

EXAMPLE 7 (COMPARATIVE)
Comparative Example of a Procedure for the Preparation of 3-Cation Catalyst.

In 2-propanol bringing the total volume to 350 mL, there were dissolved at room temperature 99.75 g (0.35 mol) titanium isopropoxide and 110 gams of a 70% solution in 2-propanol of zirconium isopropoxide (0.235 mol) and 24.4 g (0.117 mol) tetraethyl orthosilicate (TEOS). Then the above solution was added dropwise through a dropping funnel to 350 mL ethylene glycol (EG) protected by a constant flow of nitrogen gas and being stirred by means of a magnetic egg in a 1000 mL 3-necked round bottom glass flask. The temperature of the EG was maintained at 150–160° C. Initially, a soft white precipitate appeared in the solution, which turned to gel with time. Then, as the amount of 2-propanol in the mixture reduced, the precipitate disappeared and the system turned with time to be an opaque-translucent highly fluid liquid. With continued loss of volatiles, increasing amount of fine particles appeared and remained suspended in the liquid, making it increasingly opaque. After the evolution of volatiles was completed, the reaction was terminated. Upon cooling to below 100° C. the whole opaque mixture gelled and became a soft solid. Contact of the soft gel with pH paper indicated that the gel is neutral, i.e., neither basic nor acidic. The total metal ion concentration was 0.00167 mol/mL. The product described in this comparative example was labeled CATALYST 7A.

When the system described in producing CATALYST 7A was repeated but in about fourfold dilution, the 3:2:1 Ti/Zr/Si glycolate/glycoxide product remained opaque throughout with the final product having the appearance of white milk. This product contained 0.000407 mol/mL total metal ion concentration. It was labeled CATALYST 7B.

EXAMPLE 8 (COMPARATIVE)
Comparative Example for the Preparation of 3-Cation Catalyst.

A solution of 1:1:1 molar Zr/Si/Ti in 2-propanol was prepared by dissolving 23.6 g zirconium propogxide (0.05 mol)(70% in 2-propanol) and 10.5 g tetraethyl orthosilicate (0.05 mol) and 14.7 g titanium isopropoxide (0.05 mol) in 2-propanol to bring the total volume to 100 mL. This solution was mixed with 100 mL ethylene glycol and the mixture stirred and heated at 150° C. under constant nitrogen flow. Within a few minutes at temperature the initially-clear solution turned opaque and a voluminous amount white precipitate formed which solidified as slush. The distillation of 2-propanol at 150° C. was continued for 3 additional hours before it ceased. When this occurred, the heating was stopped and upon cooling to room temperature the substantially solid white slush collected. The product of this comparative example was labeled CATALYST 8. Changes in the sequencing of addition, and addition of the 2-propanol solution dropwise to the ethylene glycol did not change the end result. In all instances copious amounts of white insoluble solids were formed in the ethylene glycol within minutes from the beginning of the addition. In all these cases only ready made metal alkoxides were used and no metal chlorides (e.g., CATALYST 8 and CATALYST 12 below).

EXAMPLE 9 (COMPARATIVE)
Comparative Example for the Preparation of 1-Cation Catalyst.

A 20 mL amount of 70% by weight solution of zirconium propoxide in 2-propanol and additional 25 mL 2-propanol were added to 100 mL ethylene glycol (EG). The mixture was heated for 6 hrs. at 150° C. under constant flow of nitrogen until over 40 mL of distillate were collected. At that point, the reaction was stopped. Throughout the run, the Zr-containing species was separated out as a fine white precipitate. The product of this comparative example was labeled CATALYST 9.

EXAMPLE 10 (COMPARATIVE)

20.4 grams (0.1 moles) of aluminum isopropoxide and 50 mL of 2-propanol were suspended in 150 mL ethylene glycol (EG) (aluminum isopropoxide is insoluble in both liquids). Under continuous flow of nitrogen, the mixture was heated, with stirring, to 150° C. Vigorous boiling off of 2-propanol started after a few minutes at temperature. The distillation of 2-propanol at 150° C. was continued for 6 hours wherein an opaque mixture was obtained. Upon cooling to room temperature, the mixture retained its opacity. The opacity indicates that the system comprised small solid particles suspended in a liquid. Nominal concentration of aluminum ions in the system: 0.000877 moles/mL. This example indicates that the presence of solids caused the systems to be opaque, the suspended solids were poor catalysts (because of poor solubility) and that the appearance of solids seems to always be related to the reaction mixture during catalyst preparation being neutral or at pH higher than 4.0. The product was labeled CATALYST 12.

EXAMPLE 11 (COMPARATIVE)

20.4 grams (0.1 moles) of silicon isopropoxide and 50 mL of 2-propanol were suspended in 150 mL ethylene glycol (EG) (silicon isopropoxide is insoluble in both liquids). Under continuous flow of nitrogen, the mixture was heated, with stirring, to 150° C. Vigorous boiling off of 2-propanol started after a few minutes at temperature. The distillation of 2-propanol at 150° C. was continued for 6 hours wherein an opaque mixture was obtained. Upon cooling to room temperature, the mixture retained its opacity. The opacity indicates that the system comprised small solid particles suspended in a liquid. Nominal concentration of silicon ions in the system: 0.000877 moles/mL. This example indicates that the presence of solids caused the systems to be opaque, the suspended solids were poor catalysts (because of poor solubility) and that the appearance of solids seems to always be related to the reaction mixture during catalyst preparation being neutral or at pH higher than 4.0. The product was labeled CATALYST 13.

EXAMPLE 12 (CATALYST EVALUATION)

The efficiency of the inventive acidic glycolate/glycoxide catalysts, containing one or more chlorine atom per each metal cation, was evaluated by performing poly(ethylene terephthalate) (PET) polycondensations in the presence of these and other catalysts, and in the absence of any catalyst. In all cases, a mixture of bis(2-hydroxyethylene terephthalate)(bis-HET), with decreasing amounts of its dimer, trimer, tetramer, and diminishing amounts of higher oligomers was prepared separately from dimethylterephthalate and excess ethylene glycol (EG) in the absence of any catalyst. After purification, this bis-HET mixture had an intrinsic viscosity of less than 0.05 dL/g, and was used as the feed stock in all subsequent polymerizations. In one series of polymerizations, there were 100 g of the bis-HET mixture (equivalent to 0.52 moles PET) being heated under nitrogen flow at 278° C. with a catalyst at amounts producing concentrations of 1000 ppm total metal cation per terephthalate residue in the feed stock. After 30 minutes, the nitrogen flow was stopped and high vacuum, of about 1 mm Hg, was applied. In the case of the catalysts taught in this invention, the melt viscosity increased so rapidly that the stirring could not be maintained beyond 2 hours under vacuum, and the polymerization run was stopped after 2 hours under vacuum at temperature. In the case of comparative catalysts and in the absence of any catalyst, the reaction was continued for 3 hours under vacuum at temperature before it was stopped. In all cases, the polymeric product was immediately retrieved, cooled to dry ice temperature and ground at that temperature. After reaching ambient temperature the ground PET was dried under vacuum at about 110° C. overnight and its intrinsic viscosity measured in phenol/tetrachloroethane mixture at 25° C. as is customary in the art. The results are tabulated in Table II below where reaction time is the time in hours under vacuum and the intrinsic viscosity is measured in units of dL/g.

TABLE II

PET Polymerizations in Presence of 1000 ppm Catalysts.

| TEST | Catalyst Label | Catalyst Composition | PET I.V. | Reaction time |
|------|----------------|----------------------|----------|---------------|
| A | CATALYST 4 | 1.275:1:1 Ti/Zr/Mn; pH = 0 – 1 | 1.08 dL/g | 2 hrs. |
| B | CATALYST 3 | 1:1:1 Ti/Al/Zr pH = 0 – 1 | 0.65 dL/g* | 2 hrs. |
| C | CATALYST | none | 0.34 dL/g | 3 hrs. |
| D | CATALYST 13 | Si only, pH = 5 – 6 | 0.41 dL/g | 3 hrs. |
| E | CATALYST 12 | Al only, pH = 5 – 6 | 0.34 dL/g | 3 hrs. |
| F | CATALYST 9 | Zr only, pH = 5 – 6 | 0.37 dL/g | 3 hrs. |
| G | Antimony | Sb-glycoxide, pH = 5 – 6 | 0.35 dL/g | 3 hrs. |
| H | CATALYST 14 | 4:1 Ti/Na | 0.95 dL/g | 2 hrs. |
| I | CATALYST 10 | 5:4:1 Zr/Ti/Ge, pH = 5 – 6 | 0.33 dL/g | 2.75 hrs. |

*Stirrer stopped because of localized solidification. Localized I.V. exceeded 1.0 dL/g. Catalysts CATALYST 3 and CATALYST 4 are clear liquids after preparation and at time of introduction into the PET polymerization vessel. Comparative CATALYST 10 was in the form of opaque, particle-filled gel when introduced into the polymerization vessel. Comparative catalysts CATALYST 9, CATALYST 12, CATALYST 14 and the antimony glycoxide were in the form of solids or suspension of solids in EG when introduced into the polymerization vessel. Comparative CATALYST 13 was in the form of clear liquid. Comparative CATALYST 14 was prepared following an example in U.S. Pat. No. 5,106,944. Polyesters having an intrinsic viscosity of .5 and above are preferred. From this evaluation it is determined that tests A and B which use catalysts according to this invention produce acceptable molecular weight polyesters which do not adversely color the polymer. Tests C, D, E, F and I produce polyesters which have too low a molecular weight. Test G produces a polyester which has too low a molecular weight and additionally has a gray color from the antimony. Test H produces a polyester which has a good molecular weight but has a yellow color.

EXAMPLE 13 (CATALYST EVALUATION)

The evaluation of the catalysts was repeated by conducting PET polymerizations in larger reactors. In this case, a 5 gallon stainless steel batch reactor was used which is equipped with an anchor helix agitator and condensers to collect the distilled overheads. It can be operated at 150 psia or under a vacuum of 0.2 mm Hg at 300° C. Automated pressure and cascade temperature controls insure the repeatability and reproducibility of the process conditions. A late addition device allows to inject catalyst solution under high pressure during the esterification step. Samples of overheads, pre-polymer, and polymer are collected at the end of the esterification and polycondensation steps. The end of the process is determined by a target value of the torquemeter, measuring the torque of the anchor helix agitator. A polymer with intrinsic viscosity of around 0.9 dL/g was removed from the bottom of the reactor and converted into pellets for subsequent analysis and use. Initially, the reactor is charged under nitrogen flow with a paste made from 5400 grams terephthalic acid, 3480 g ethylene glycol, and 24.0 diisopropylamine as diethyleneglycol (DEG) suppressant. The agitator speed is set at 24 rpm and maintained throughout the esterification stage. The reactor is pressurized with nitrogen to 30 psi and vented three times to remove as much as possible of the oxygen in the system. The reactor is then sealed off and preheated to 180° C. for the next 60 minutes, a period during which the autogeneous pressure-reaches 90 psi. The esterification is carried out at a 90 psi for the next 45 minutes and overheads are collected from an on-line condenser. Then the pressure is gradually reduced to zero psi at a rate of −1.5 psi/min. The catalyst is then injected into the reactor through a pressurized late addition device, in the form of a solution in 50 g ethylene glycol. At the end of the esterification stage, the internal temperature rises to reach 270° C. The reactor is purged with nitrogen at atmospheric pressure and a pre-polymer sample is collected. During the subsequent polycondensation stage, the temperature is maintained at 275° C. throughout, while vacuum is pulled out in a stepwise manner. The internal pressure is kept in the following pattern: 200 mm Hg for 30 min., 30 mm Hg for 30 min., and 2.5 mm Hg for 60 minutes. The final stage of the polymerization is carried out at 280° C. under vacuum of 0.4 to 0.2 mm Hg. During this stage the increase in melt viscosity is monitored by means of a torquemeter. At standard conditions, torque of 1,000 in/lb corresponds to a polymer with target intrinsic viscosity of 0.9 dL/g (measured in pheno/tetrachloroethane mixture). The reaction time varies in correlation to the catalyst efficiency. For a constant molar concentration of catalyst, the higher its efficiency the shorter will be the time for the polymer melt to reach a melt viscosity generating the target torque. There were five the inventive acidic glycolate/glycoxide catalysts evaluated in the reactor described above using the above described procedure. In all instances, the catalyst concentration was used to keep constant the concentration of the titanium component of the catalyst at a level of 20 ppm Ti. In addition to the inventive acidic glycolate/glycoxide catalysts, there were tested a neutral gel catalyst prepared with 3 kinds of metal cations, namely 5:4:1 Zr/Ti/Ge gel having pH=5–6 CATALYST 10; an 8:1 Al/Co catalyst, CATALYST 11 prepared to be a similar composition to a catalyst described in U.S. Pat. No. 5,512,340; a duPont manufactured titanium catalyst denoted by Tyzor TE; and an antimony acetate catalyst serving as a control. While the concentration of the Tyzor TE catalyst was kept to maintain the Ti ion concentration at 20 ppm, the metal ion concentration of CATALYST 11 was kept at 100 ppm Co and 800 ppm Al, and the concentration of the antimony acetate catalyst brought the level of antimony ions to 440 ppm of the terephtalate residues in the system. In Table III are first shown the results of our acidic glycolate/glycoxide catalysts, followed by the comparative examples described in this paragraph.

TABLE III

PET Polymerizations Using Acidic Glycolate/Glycoxide Catalysts and Comparative Examples

| Test | Catalyst Code | Catalyst Description | Intrinsic Viscosity I.V. (dl/g) | Minutes In Vacuum |
|---|---|---|---|---|
| 1 | CATALYST 5 | Ti only, pH = 0 – 1 | 0.88 | 150 |
| 2 | CATALYST 2 | 3:2:1 Ti/Zr/Ge; pH = 0 – 1 | 0.94 | 150 |
| 3 | CATALYST 1 | 3:2:1 Ti/Zr/Si pH = 0 – 1 | 0.95 | 135 |
| 4 | CATALYST 3 | 1:1:1 Ti/Al/Zr; pH = 0 – 1 | 0.89 | 125 |
| 5 | CATALYST 4 | 1.275:1:1 Ti/Mn/Zr pH = 0 – 1 | 0.86 | 120 |
| 6 | CATALYST 10 | 5:4:1 Zr/Ti/Ge gel; pH = 5 – 6 | 0.85 | 150 |
| 7 | Tyzor Th | Ti only | 0.84 | 135 |
| 8 | CATALYST 11 | 8:1 Al/Co, pH = 0 – 1 | 0.65 | 180 |
| 9 | Control | antimony acetate | 0.92 | 180 |

The data from Table III show that the first 5 entries, presenting catalysts according to the invention, produce acceptably high molecular weight polyesters in an acceptable period of time. In test 6, CATALYST 10 is unacceptable since it gels and is thus hard to handle. Test 7 uses a catalyst which is unacceptable since it produces a polyester which yellows. Test 8 uses a catalyst which is unacceptable since only a low molecular weight polyester is formed and at a very slow rate. CATALYST 11 of acidic 8:1 Al/Co clearly reveals that it is insufficient for the catalyst to merely be acidic in order to be efficient. The Al/Co catylyst is very inefficient, as is evidenced for its low intrinsic viscosity obtained after a very long reaction time. Test 8 uses a catalyst which is unacceptable since a gray polyester is formed and at a very slow rate. The catalysts in the first 5 entries were all acidic, a fact that kept them in liquid form, but they owe their reactivity to the combination of cations in them, in addition to their solubility in the polymeization mixture which is brought about by the catalysts being liquid and insensitive to hydrolytic degradation.

What is claimed is:

1. A process for the preparation of a catalyst for the polymerization of polyesters which comprises the steps of:
   (a) heating at least one aliphatic polyol to a temperature in the range of from about 120° C. to about 195° C. and adding thereto an acid chloride and/or acid bromide of a trivalent metal, a tetravalent metal or mixtures thereof to form a blend;
   (b) adding at least one metal alkoxide to the blend of step (a);
   (c) recovering a mixture of one or more metal glycoxides with one or more metal glycolates.

2. The process of claim 1 wherein step (c) is performed by removing produced monoalcohols, hydrochloric acid, hydrobromic acid and unreacted polyols from the result of step (b), and cooling the resulting product to thereby produce a liquid polymerization catalyst which comprises a mixture of one or more metal glycoxides with one or more metal glycolates.

3. The process of claim 1 wherein the aliphatic polyol is selected from the group consisting of glycerin, pentaerythritol, mono alkylene glycols, dialkylene glycols, tri alkylene glycols and mixtures thereof.

4. The process of claim 1 wherein the acid chloride or acid bromide is reacted with or dissolved in a $C_3$ or higher alcohol.

5. The process of claim 1 wherein the metal alkoxide is in solution with a $C_2$ or higher alcohol.

6. The process of claim 1 which is conducted under an inert atmosphere.

7. The process of claim 6 wherein the inert atmosphere comprises nitrogen gas or argon gas.

8. The process of claim 1 wherein the produced polymerization catalyst has a pH in the range of from about 0 to about 1.

9. The process of claim 1 wherein the produced polymerization catalyst contains chlorine and/or bromine atoms at a number ratio of chlorine and/or bromine to total metal cations in the catalyst ranging from about 0.5:1 to about 3:1.

10. The process of claim 1 wherein the produced polymerization catalyst is in the form of a clear, stable solution.

11. The process of claim 1 wherein step (a) is conducted with an acid chloride or acid bromide selected from the group consisting of zirconium tetrachloride, germanium tetrachloride, titanium tetrachloride, silicon tetrachloride, tin chloride, manganese chloride, aluminum trichloride, gallium trichloride, indium trichloride, yttrium trichloride, trichlorides of members of the lanthanide series of the Periodic Table of the Elements, zirconium tetrabromide, germanium tetrabromide, titanium tetrabromide, silicon tetrabromide, tin bromide, manganese bromide, aluminum tribromide, gallium tribromide, indium tribromide, yttrium tribromide, tribromides of members of the lantanide series of the Periodic Table of the Elements, and mixtures thereof.

12. The process of claim 1 wherein step (b) is conducted with a metal alkoxide which is a $C_2$ to $C_4$ alkoxide or mixtures thereof.

13. The process of claim 1 wherein step (b) is conducted with a metal alkoxide selected from the group consisting of titanium ethoxide, titanium butoxide, titanium propoxide, titanium isopropoxide, silicon ethoxide, silicon butoxide, silicon propoxide, silicon isopropoxide, germanium ethoxide, germanium butoxide, germanium propoxide, germanium isopropoxide, aluminum ethoxide, aluminum butoxide, aluminum propoxide, aluminum isopropoxide, zirconium ethoxide, zirconium butoxide, zirconium propoxide, zirconium isopropoxide, and mixtures thereof.

14. The process of claim 1 wherein step (a) is conducted with ethylene glycol, trimethylene glycol, tetramethylene glycol or mixtures thereof.

15. The process of claim 1 wherein steps (a), (b) and (c) are conducted until substantially all of the produced monoalcohols, hydrochloric acid and hydrobromic acid are removed.

16. The process of claim 1 wherein steps (a), (b) and (c) are conducted for from about 0.5 hour to about 12 hours.

17. The process of claim 1 wherein the mole ratio of metal glycoxide to metal glycolate ranges from about 1:10 to about 10:1.

18. A polymerization catalyst which comprises a chlorine and/or bromine containing solution of a metal glycoxide and a metal glycolate having a pH in the range of from 0 to about 1, and containing chlorine and/or bromine atoms at a number ratio of chlorine and/or bromine to total metal cations in the catalyst ranging from about 0.5:1 to about 3:1.

19. The polymerization catalyst of claim 18 wherein the weight ratio of metal glycoxide to metal glycolate ranges from about 1:10 to about 10:1.

20. A process for producing a polyester composition which comprises condensing a reaction mixture comprising a dibasic acid or a lower alkyl ester thereof with a glycol in the presence of a catalytic amount of a polymerization catalyst which comprises a chlorine and/or bromine containing solution of a metal glycoxide and a metal glycolate having a pH in the range of from 0 to about 1, and containing chlorine and/or bromine atoms at a number ratio of chlorine and/or bromine to total metal cations in the catalyst ranging from about 0.5:1 to about 3:1.

21. The process of claim 20 the concentration of metal cations in the reaction mixture originating from the catalyst is in the range from about 10 ppm to about 1000 ppm relative to the amount of dibasic acid condensed.

22. The process of claim 20 wherein the dibasic acid or a lower alkyl diester is selected from the group consisting of terephthalic acid, isophthalic acid, phthalic acid, naphthalene dicarboxylic acid, biphenylene dicarboxylic acid, tetrahydroterephthalic acid, tetrahydroisophthalic acid, tetrahydrophthalic acid, hydronaphthalene dicarboxylic acid, cyclohexanedicarboxylic acid, cyclopentyldicarboxylic acid, cyclooctyldicarboxylic acid, succinic acid, glutaric acid, adipic acid, sebacic acid, azelaic acid, pimelic acid, malonic acid, fumaric acid, itaconic acid, bibenzoic acid, their monoesters, their diesters, and mixtures thereof.

23. The process of claim 20 wherein the glycol is selected from the group consisting of ethylene glycol, propylene glycol, 1,3-propanediol, 1,4butanediol, 1,6hexanediol, cyclohexane diol, cyclohexanedimethanol, neopentyl glycol, 1,8-octanediol, 1,10-decanediol, 1,12-dodecanediol, diethylene glycol, triethylene glycol, tetraethylene glycol, dihydroxy-terminated higher oligomers of ethylene glycol, dimer of trimethylene glycol, trimer of trimethylene glycol, dimer of tetramethylene glycol, trimer of tetramethylene glycol, dihydroxy-terminated higher oligomers of tetramethylene glycol, and mixtures thereof.

24. The process of claim 20 wherein the dibasic acid is terephthalic acid or 2,6-naphthalene dicarboxylic acid and the glycol is ethylene glycol, propylene glycol, 1,4-butanediol 1,3-trimethylenediol or 1,4-cyclohexanedimethanol.

25. The process of claim 20 wherein the dibasic acid is terephthalic acid and the glycol is ethylene glycol.

\* \* \* \* \*